(12) United States Patent
Mano et al.

(10) Patent No.: US 9,909,520 B2
(45) Date of Patent: Mar. 6, 2018

(54) DEVICE AND METHOD FOR CONTROLLING INTERNAL COMBUSTION ENGINE

(71) Applicant: NISSAN MOTOR CO., LTD., Yokohama-shi, Kanagawa (JP)

(72) Inventors: Tadaki Mano, Sagamihara (JP); Naonori Onoda, Kamakura (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/768,279

(22) PCT Filed: Jan. 10, 2014

(86) PCT No.: PCT/JP2014/050287
§ 371 (c)(1),
(2) Date: Aug. 17, 2015

(87) PCT Pub. No.: WO2014/129225
PCT Pub. Date: Aug. 28, 2014

(65) Prior Publication Data
US 2015/0377175 A1    Dec. 31, 2015

(30) Foreign Application Priority Data

Feb. 22, 2013    (JP) .................................. 2013-032768

(51) Int. Cl.
*F02D 41/34*    (2006.01)
*F02D 15/02*    (2006.01)
(Continued)

(52) U.S. Cl.
CPC .......... *F02D 41/345* (2013.01); *F02B 75/048* (2013.01); *F02D 15/02* (2013.01);
(Continued)

(58) Field of Classification Search
CPC .. F02B 75/048; F02B 2075/125; F02D 15/02; F02D 2041/001; F02D 2041/389; F02D 41/345; F02D 41/40; F02D 41/401
(Continued)

(56) References Cited

U.S. PATENT DOCUMENTS 5,794,585 A * 8/1998 Yonezawa ........... F02D 41/3029
123/27 R
5,794,586 A * 8/1998 Oda ...................... F02D 33/006
123/179.17
(Continued)

FOREIGN PATENT DOCUMENTS

EP    1160430 A2    12/2001
JP    11-101143    4/1999
(Continued)

OTHER PUBLICATIONS

U.S. Appl. No. 14/764,343, filed Jul. 29, 2015, Mano et al.
U.S. Appl. No. 14/764,359, filed Jul. 29, 2015, Mano et al.
U.S. Appl. No. 14/774,770, filed Sep. 11, 2015, Mano et al.

*Primary Examiner* — Lindsay Low
*Assistant Examiner* — John Zaleskas
(74) *Attorney, Agent, or Firm* — Drinker Biddle & Reath LLP

(57) ABSTRACT

A control device for an internal combustion engine including a variable compression ratio mechanism arranged to vary a relative position relationship between a piston and a cylinder, and thereby to vary a mechanical compression ratio, and a fuel injection valve arranged to directly inject a fuel within a combustion chamber, the control device includes: at least in an engine high load region including a full open, the compression ratio at an exhaust upper dead center being controlled to a low compression ratio, a fuel injection start timing of the fuel in which an air-fuel mixture is formed within the combustion chamber, and which is ignited by an (Continued)

ignition plug being set before an exhaust upper dead center so that a fuel injection period crosses an upper dead center.

4 Claims, 3 Drawing Sheets

(51) Int. Cl.
| | |
|---|---|
| *F02M 45/00* | (2006.01) |
| *F02M 61/04* | (2006.01) |
| *F02M 61/14* | (2006.01) |
| *F02P 15/06* | (2006.01) |
| *F02B 75/04* | (2006.01) |
| *F02D 41/40* | (2006.01) |
| *F02D 41/00* | (2006.01) |
| *F02D 41/38* | (2006.01) |

(52) U.S. Cl.
CPC ........... *F02D 41/401* (2013.01); *F02M 45/00* (2013.01); *F02M 61/04* (2013.01); *F02M 61/14* (2013.01); *F02P 15/06* (2013.01); *F02D 41/40* (2013.01); *F02D 2041/001* (2013.01); *F02D 2041/389* (2013.01); *Y02T 10/44* (2013.01)

(58) Field of Classification Search
USPC ........ 123/48 R, 48 B, 78 F, 90.15, 294, 295, 123/299, 305, 478; 701/103, 104, 105
See application file for complete search history.

(56) References Cited

U.S. PATENT DOCUMENTS

| | | | | |
|---|---|---|---|---|
| 6,067,954 | A * | 5/2000 | Kudou | F02D 41/10 123/295 |
| 6,267,097 | B1 * | 7/2001 | Urushihara | F01L 1/34 123/299 |
| 6,386,177 | B2 * | 5/2002 | Urushihara | F02M 26/01 123/299 |
| 6,425,367 | B1 * | 7/2002 | Hiraya | F02B 1/12 123/299 |
| 7,051,700 | B2 * | 5/2006 | Kuzuyama | F02D 13/0207 123/299 |
| 7,159,543 | B2 | 1/2007 | Hotta et al. | |
| 7,228,839 | B2 * | 6/2007 | Kuo | F01L 1/34 123/294 |
| 7,334,573 | B2 * | 2/2008 | Shiraishi | F02D 15/02 123/568.14 |
| 7,367,308 | B2 * | 5/2008 | Kuo | F02D 9/02 123/295 |
| 7,370,616 | B2 * | 5/2008 | Kuo | F01L 1/344 123/568.14 |
| 7,370,633 | B2 * | 5/2008 | Kang | F02M 26/01 123/305 |
| 7,654,245 | B2 * | 2/2010 | Kohler | F02D 41/064 123/299 |
| 7,669,578 | B2 * | 3/2010 | Yamashita | F02B 17/00 123/295 |
| 7,684,925 | B2 * | 3/2010 | Kuo | F02B 17/00 701/113 |
| 7,703,434 | B2 * | 4/2010 | Sloane | F02D 13/0265 123/299 |
| 7,832,370 | B2 * | 11/2010 | Sutherland | F01L 13/0015 123/143 A |
| 2001/0047778 | A1 | 12/2001 | Aoyama et al. | |
| 2003/0106542 | A1 * | 6/2003 | Aoyama | F01L 1/34 123/568.14 |
| 2004/0123818 | A1 * | 7/2004 | Sugiyama | F02B 75/048 123/48 B |
| 2005/0103305 | A1 * | 5/2005 | Aoyama | F02B 71/04 123/192.2 |
| 2005/0268870 | A1 * | 12/2005 | Hotta | F02D 15/02 123/78 F |
| 2006/0016425 | A1 * | 1/2006 | Kono | F02D 41/0002 123/305 |
| 2006/0137632 | A1 | 6/2006 | Aoyama et al. | |
| 2007/0068485 | A1 * | 3/2007 | Hilditch | F02D 41/0255 123/299 |
| 2007/0074702 | A1 * | 4/2007 | Nakamura | F01N 3/035 123/299 |
| 2009/0018755 | A1 * | 1/2009 | Inoue | F02D 13/0249 701/103 |
| 2009/0070014 | A1 * | 3/2009 | Miyashita | F02D 13/0261 701/105 |
| 2009/0084347 | A1 * | 4/2009 | Gwidt | F02D 41/3017 123/294 |
| 2009/0088945 | A1 * | 4/2009 | Yi | F02D 41/401 701/103 |
| 2011/0005496 | A1 * | 1/2011 | Hiraya | F02D 15/02 123/48 B |
| 2011/0203553 | A1 * | 8/2011 | Chiba | F02D 13/0215 123/478 |
| 2012/0222407 | A1 * | 9/2012 | Miwa | F01N 9/00 60/284 |
| 2013/0055990 | A1 * | 3/2013 | Kamada | F02D 15/00 123/48 R |
| 2014/0053813 | A1 | 2/2014 | Fukuda et al. | |

FOREIGN PATENT DOCUMENTS

| | | |
|---|---|---|
| JP | 2001-342859 A | 12/2001 |
| JP | 2003-106177 A | 4/2003 |
| JP | 2003227376 A * | 8/2003 |
| JP | 2004-116434 A | 4/2004 |
| JP | 2005-344644 | 12/2005 |
| JP | 2006070863 A * | 3/2006 |
| JP | 2006-132546 | 5/2006 |
| JP | 2006-177271 A | 7/2006 |
| JP | 2009-047009 A | 3/2009 |
| JP | 2011-080424 A | 4/2011 |
| JP | 2011-202568 | 10/2011 |
| WO | WO-2012/157043 A1 | 11/2012 |

* cited by examiner

DEVICE AND METHOD FOR CONTROLLING INTERNAL COMBUSTION ENGINE

TECHNICAL FIELD

This invention relates to an internal combustion engine arranged to directly inject a fuel into a combustion chamber, and to ignite a generated mixture air by an ignition plug, more specifically to a control device and a control method for an internal combustion engine provided with a variable compression ratio mechanism.

BACKGROUND ART

Conventionally, there are known various types of variable compression ratio mechanisms arranged to vary a mechanical compression ratio of an internal combustion engine. For example, the present applicant and so on make many proposals of the variable compression ratio mechanisms arranged to vary a geometry of a multi-link piston crank mechanism. Furthermore, there is known a variable compression ratio mechanism arranged to displace a position of the cylinder in the upward and downward directions with respect to a center position of the crank shaft.

On the other hand, there is known a spark ignition internal combustion engine of cylinder direct injection type in which a fuel injection valve is disposed to confront the combustion chamber, and which is arranged to inject the fuel directly to the cylinder. In this internal combustion engine of the cylinder direct injection type, as described in the patent document 1, when homogeneous combustion is performed in particular in the high load region, the fuel injection is performed during the intake process. The fuel injection period which is set in this way during the intake process is a value based on the actual time, and which is proportional to the fuel injection amount. The crank angle becomes larger as it is higher speed and higher load. When the injection rate of the fuel injection valve (the injection amount per the unit time) is small, the fuel injection is not finished until a timing after an intake lower dead center. The evaporation and the mixture of the fuel is deteriorated.

With respect to this problems, the patent document 1 is arranged to provide a deference of the lift characteristics of the pair of the intake valves in the high speed and high load region, so as to generate a swirl. With this, the evaporation of the fuel and the mixture of the fuel are advanced (facilitated).

In this case, the patent document 1 discloses an example in which a fuel injection start timing in the high load region is just set to an exhaust upper dead center (referred also to an intake upper dead center). In a case where the fuel injection is started at the exhaust upper dead center in this way, the injected fuel is impinged and adhered on the piston. This becomes the cause for the generation of the smoke in the high load region. Generally, the fuel injection is started at a timing slightly later than the exhaust upper dead center.

As described in the patent document 1, in a case where the fuel injection end timing is excessively retarded at the high load, it is not possible to ensure the time necessary for the mixture and the evaporation of the fuel spraying, so that the combustion is deteriorated. On the other hand, in a case where the fuel injection start timing is closer to the exhaust upper dead center, the smoke is increased by the collision and the adhesion of the fuel on the piston. Accordingly, it is necessary to ensure the injection rate of the fuel injection valve to the large rate to some extent. However, when the injection rate of the fuel injection valve is large, the injection period (that is, the opening period of the fuel injection valve) becomes excessively short when the fuel injection amount is small. Consequently, the measurement accuracy is decreased.

PRIOR ART DOCUMENT

Patent Document

Patent Document 1: Japanese Patent Application Publication No. 2003-106177

SUMMARY OF THE INVENTION

It is an object of the present invention to handle a relatively long injection period in a high load region by an approach different from an evaporation and mixture advancement like the patent document 1, and to set an injection rate of a fuel injection valve to a relatively small value.

The present invention is a control device for an internal combustion engine including a variable compression ratio mechanism arranged to vary a relative position relationship between a piston and a cylinder, and thereby to vary a mechanical compression ratio, and a fuel injection valve arranged to directly inject a fuel within a combustion chamber, the control device comprising: at least in an engine high load region including a full open, the compression ratio being controlled to a low compression ratio, a fuel injection start timing being set before an exhaust upper dead center so that a fuel injection period crosses an upper dead center.

More preferably, the variable compression ratio mechanism is a multi-link piston crank mechanism; and the multi-piston crank mechanism has a link geometry set so that a rising speed of the piston near an upper dead center becomes smaller than a rising speed of a single link piston crank mechanism in the same process.

In the present invention, in a high load region in which a fuel injection period corresponding to the fuel injection amount becomes long, the compression ratio by the variable compression ratio mechanism becomes a low compression ratio. Accordingly, the position of the piston (the position with respect to the cylinder) at the upper dead center becomes lower relative to the high compression ratio. That is, the distance between the fuel injection valve disposed on the cylinder side and the piston crown surface is increased relative to the high compression ratio. Accordingly, when the fuel is injected from the fuel injection valve near the exhaust upper dead center, the collision and the adhesion toward the piston crown surface is suppressed.

Accordingly, even when the fuel injection start timing is set to a timing before the exhaust upper dead center so that the fuel injection period crosses the exhaust upper dead center, the smoke is hard to be generated. It is possible to permit a relatively long injection time period without excessively retarding the fuel injection end timing. Consequently, it is possible to use the fuel injection valve having a small injection rate.

Moreover, in a case where the variable compression ratio mechanism is a multi-link piston crank mechanism having a small piston rising (ascending) speed near the upper dead center, the relative speed of the piston with respect to the spraying becomes small. The collision with the piston crown surface is further relieved. This is further superior in the suppression of the smoke.

By this invention, the relatively long injection period can be permitted without excessively retarding the fuel injection end timing at the high load, and to use the fuel injection valve having the small injection rate.

DESCRIPTION OF EMBODIMENTS

Hereinafter, one embodiment according to the present invention is illustrated in detail based on the drawings.

Figure 1:
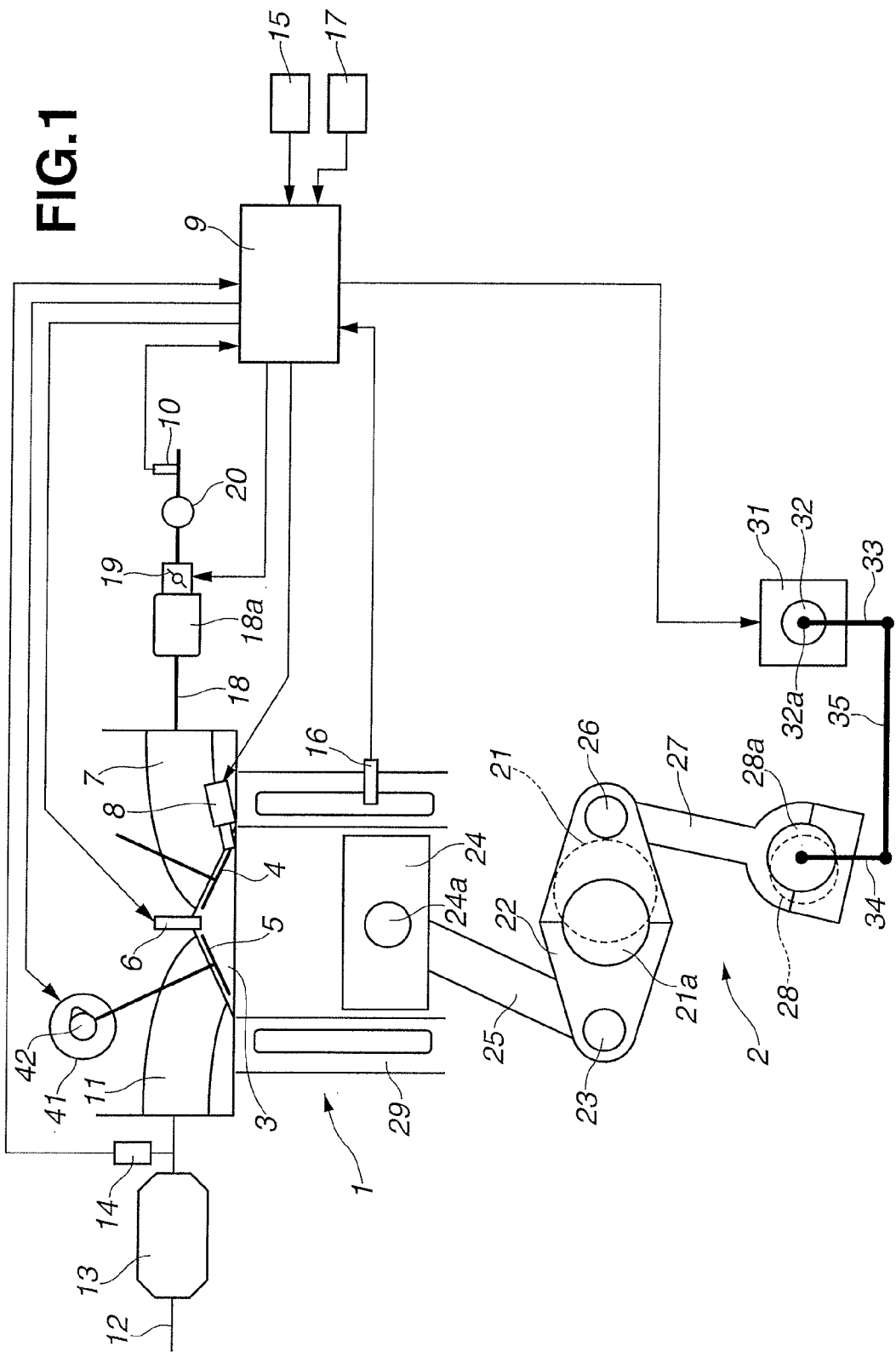
FIG. 1 is a configuration illustrating view showing a system configuration of a control device according to one embodiment of the present invention.

FIG. 1 shows a system configuration of a vehicular internal combustion engine 1 to which the present invention is applied. This internal combustion engine 1 is a cylinder direct injection type ignition internal combustion engine which is a four stroke cycle engine, which is provided with a turbocharger, and which is provided with a variable compression ratio mechanism 2 that uses a multi-link type piston crank mechanism. A pair of intake valves 4 and a pair of exhaust valves 5 are disposed on a wall surface of a ceiling (top surface) of a combustion chamber 3. An ignition plug 6 is disposed at a central portion surrounded by these intake valves 4 and exhaust valves 5.

A fuel injection valve 8 is disposed below an intake port 7 arranged to be opened and closed by the intake valve 4. The fuel injection valve 8 is arranged to directly inject the fuel within the combustion chamber 3. The fuel injection valve 8 is an electromagnetic or piezoelectric injection valve arranged to be opened by being applied with a driving pulse signal. The fuel injection valve 8 injects the fuel having an amount which is substantially proportional to a pulse width of this pulse signal. In the example shown in the drawings, the fuel injection valve 8 is disposed to inject the fuel in a downwardly oblique direction.

An electrically controlled type throttle valve 19 is disposed on an upstream side of a collector portion 18a of an intake passage 18 connected with the intake port 7. An opening degree of the electrically controlled type throttle valve 19 is controlled by a control signal from the engine controller 9. On the further upstream side of the electrically controlled type throttle valve 19, there is provided a compressor 19 of the turbocharger. On the upstream side of this compressor 20, there is provided an air flow meter 10 arranged to sense an intake air quantity.

The exhaust valve 5 is provided with an exhaust side variable valve actuating mechanism 41 which is arranged to control to vary an opening and closing timing of the exhaust valve 5. This variable valve actuating mechanism 41 may be a mechanism arranged to independently vary an opening timing and a closing timing, and a mechanism arranged to simultaneously advance or retard the opening timing and the closing timing. In this embodiment, the variable valve actuating mechanism 41 is a latter type arranged to advance and retard a phase of the exhaust side cam shaft 42 with respect to a crank shaft 21. Besides, the intake valve 4 may be provided with a similar variable valve actuating mechanism.

Moreover, there is a catalyst device 13 which is disposed on the exhaust passage 12 connected to the exhaust port 11, and which is constituted by a three-way catalyst. On the upstream side of the catalyst device 13, there is disposed an air fuel ratio sensor 14 arranged to sense an air fuel ratio.

The engine controller 9 is arranged to receive detection signals of sensors such as the air flow meter 10, the air fuel ratio sensor 14, and moreover a crank angle sensor 15 arranged to sense an engine rotation speed, a water temperature sensor 16 arranged to sense a coolant temperature, and an accelerator opening degree sensor 17 arranged to sense a depression amount of an accelerator pedal which is operated by a driver. The engine controller 9 is arranged to appropriately control a fuel injection amount and an injection timing by the fuel injection valve 8, an ignition timing by an ignition plug 6, an opening degree of a throttle valve 19, an opening and closing timing of the exhaust valve 5, and so on.

In this case, the injection amount of the fuel injection valve 8 is controlled to target a stoichiometric air fuel ratio by a known feedback control based on the detection signals of the air fuel ratio sensor, except for a part of the driving region (some driving region). That is, an air fuel ratio feedback correction coefficient $\alpha$ is calculated based on the detection signals of the air fuel ratio sensor 14. The fuel injection amount to be injected from the fuel injection valve 8 is determined by multiplying the basic fuel injection amount by this air fuel ratio feedback correction coefficient $\alpha$.

On the other hand, the variable compression ratio mechanism 2 uses a known multi-link piston crank mechanism described in Japanese Patent Application Publication No. 2004-116434. The variable compression ratio mechanism 2 mainly includes a lower link 22 rotatably supported by a crank pin 21a of the crank shaft 21; an upper link 25 connecting an upper pin 23 provided at one end portion of this lower link 22, and a piston pin 24a of the piston 24; a control link 27 having one end connected to a control pin 26 provided at the other end portion of the lower link 22; and a control shaft 28 swingably supporting the other end of this control link 27. The crank shaft 21 and the control shaft 28 are rotatably supported through a bearing structure (not shown) within a crank case provided at a lower portion of the cylinder block 29. The control shaft 28 includes an eccentric shaft portion 28a whose a position is varied in accordance with the pivot movement of the control shaft 28. The end portion of the control link 27 is rotatably mounted in this eccentric shaft portion 28a. In this variable compression ratio mechanism 2, an upper dead center of the piston 24 is displaced in the upward and downward directions in accordance with the pivot movement of the control shaft 28. Accordingly, the mechanical compression ratio is varied.

Moreover, an electric motor 31 is disposed at a lower portion of the cylinder block 29 as a driving mechanism arranged to variably control the compression ratio of the variable compression ratio mechanism 2. The electric motor 31 has a rotation center shaft which is parallel to the crank shaft 21. A speed reduction device 32 is connected to this electric motor 31 to be arranged in series with the electric motor 31 in the axial direction. This speed reduction device 32 uses, for example, a wave gearing mechanism having a large speed reduction ratio. A speed reduction device output shaft 32a of the speed reduction device 32 is positioned coaxially with an output shaft (not shown) of the electric motor 31. Accordingly, the speed reduction device output shaft 32a and the control shaft 28 are positioned in parallel with each other. The first arm 33 fixed to the speed reduction device output shaft 32*a*, and the second arm 34 fixed to the control shaft 28 are connected to each other through an intermediate link 35 so that the speed reduction device output shaft 32*a* and the control shaft 28 are interlockingly pivoted with each other.

That is, when the electric motor 31 is rotated, the speed of the rotation is largely decreased by the speed reduction device 32, and an angle of the speed reduction device output shaft 32*a* is varied. The pivot movement of the speed reduction device output shaft 32*a* is transmitted from the first arm 33 through the intermediate link 35 to the second arm 34, so that the control shaft 28 is pivoted. With this, as described above, the mechanical compression ratio of the internal combustion engine 1 is varied. Besides, in the example shown in the drawing, the first arm 33 and the second arm 34 extend in the same direction. Accordingly, for example, when the speed reduction device output shaft 32*a* is pivoted in the clockwise direction, the control shaft 28 is pivoted in the clockwise direction. However, the link mechanism may be constructed so that the control shaft 28 is pivoted in the opposite direction.

The target compression ratio of the variable compression ratio mechanism 2 is set in the engine controller 9 based on the engine driving condition (for example, desired load and the engine rotation speed). The electric motor 31 is drivingly controlled so as to attain this target compression ratio.

Figure 2:
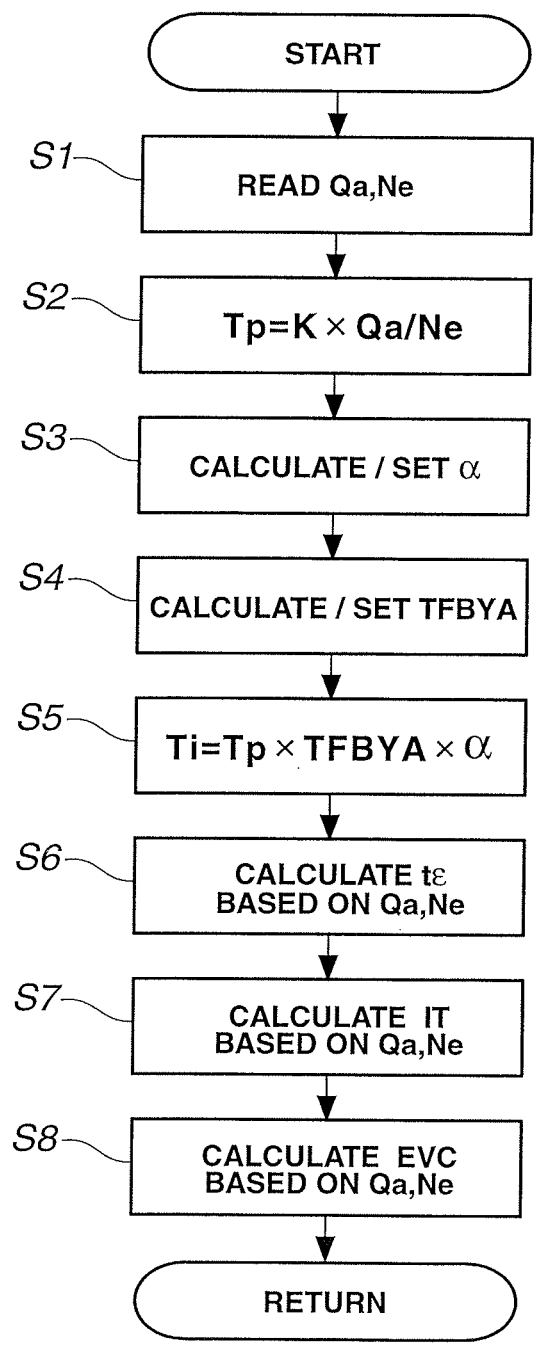
FIG. 2 is a flowchart showing a flow of a control in this embodiment.

FIG. 2 is a flowchart showing a flow of the control of this embodiment which is repeatedly performed in the engine controller 9 at a predetermined time interval during the drive of the internal combustion engine 1.

First, at step 1, the intake air quantity Qa and the rotation speed (engine speed) Ne are read. The intake air quantity Qa is a detection value of the air flow meter 10. The rotation speed Ne is successively (sequentially) calculated from the sensing signal of the crank angle sensor 15.

At step 2, the basic fuel injection pulse width Tp corresponding to the above-described basic fuel injection amount is calculated from the intake air quantity Qa, the rotation speed Ne, and a predetermined coefficient K. The basic fuel injection pulse width Tp is a driving pulse width of the fuel injection valve 8 which corresponds to the fuel injection amount by which the air fuel ratio becomes the stoichiometric air fuel ratio.

At step 3, the above-described air fuel ratio feedback correction coefficient α is calculated or set. When the air fuel ratio feedback control condition is satisfied, the air fuel ratio feedback correction coefficient α for setting the air fuel ratio to the stoichiometric air fuel ratio is calculated based on the sensing signal of the air fuel ratio sensor 14. When the air fuel ratio feedback control condition is not satisfied, the air fuel ratio feedback correction coefficient α is set to 1 since it is the open loop control.

At step 4, a target equivalent ratio TFBYA necessary for (at) the open loop control of the air fuel ratio. When the air fuel ratio feedback control condition is satisfied, the target equivalent ratio TFBYA is fixedly set. When the air fuel ratio feedback control condition is not satisfied and it is the open loop control, the target equivalent ratio TFBYA is set to a value larger than 1 for increasing the necessary fuel amount. For example, in the high load region in which it becomes the open loop control, the target equivalent ratio TFBYA is set to a value larger than 1 based on the intake air quantity Qa and the rotation speed Ne.

Then, at step 5, the fuel injection pulse width Ti is calculated by multiplying the basic fuel injection pulse width Tp by the target equivalent ratio TFBYA and the air fuel ratio feedback correction coefficient α. By a fuel injection control routine (not shown), the injection valve opening drive signal according to this fuel injection pulse width Ti is transferred to the fuel injection valve 8 of each cylinder at an injection timing (described later). With this, the fuel having the amount which is substantially proportional to the fuel injection pulse width Ti is injected within the cylinder of each cylinder. Besides, the basic fuel injection pulse width Tp and the fuel injection pulse width Ti are values based on actual time.

On the other hand, at step 6, the target compression ratio tε is calculated. In particular, the value (the target compression ratio tε) corresponding to the intake air quantity Qa and the rotation speed Ne at that time is looked up from a control map in which the target compression ratio tε is indexed by using, as the parameter, the intake air quantity Qa and the rotation speed Ne which correspond to the load. The target compression ratio tε is the mechanical compression ratio by (at) which the knocking is not generated under the corresponding intake air quantity Qa (the load) and the rotation speed Ne, by (at) which the thermal efficiency becomes best, and which is previously adjusted by the experiment. Basically, the target compression ratio tε is set to a high value in the low load side. As the load is increased, the target compression ratio tε becomes the lower value by being restricted by the knocking.

At step 7, the fuel injection start timing IT is calculated based on the intake air quantity Qa and the rotation speed Ne. Specifically, the value (the fuel injection start timing IT) corresponding to the intake air quantity Qa and the rotation speed Ne at that time is looked up from the control map in which the fuel injection start timing IT is indexed by using, as the parameter, the rotation speed Ne and the intake air quantity Qa which correspond to the load. As described later, the values of the control map are indexed to be optimum in consideration of ensuring the time period necessary for the evaporation and mixture of the injected fuel, and for avoiding the generation of the smoke due to the collision with the piston 24 of the spraying. In the low middle load region, the fuel injection start timing IT is set during the intake process. In a predetermined high load region including at least a fully open condition (the driving condition in which the fuel injection pulse width Ti becomes maximum), the fuel injection start timing IT is set to the latter term of the exhaust process, that is, the advance angle side of the exhaust upper dead center so that the fuel injection period crosses (continues across) the exhaust upper dead center.

Besides, although this is not the object of the present invention, if the stratified charge combustion is performed in the low or middle load region, the fuel injection start timing IT is set to the latter term of the compression process in the corresponding driving region.

At step 8, the exhaust valve closing timing EVC is calculated based on the intake air quantity Qa and the rotation speed Ne. The value (exhaust valve closing timing EVC) which corresponds to the intake air quantity Qa and the rotation speed Ne at that time is looked up from the control map in which the exhaust valve closing timing EVC is indexed by using, as the parameter, the rotation speed Ne and the intake air quantity Qa which correspond to the load. The values of the control map are set in consideration of the fuel injection start timing IT at least in the high load region. The exhaust valve closing timing EVC becomes also the value on the advance angle side of the exhaust upper dead center so that the fuel injected at a point near the upper dead center does not blows through the exhaust valve 5 toward the exhaust port 11. The exhaust side variable valve actuating mechanism 41 is controlled to attain this exhaust valve closing timing EVC. The exhaust side variable valve actuating mechanism 41 is controlled so as to attain this exhaust valve closing timing EVC.

Figure 3:
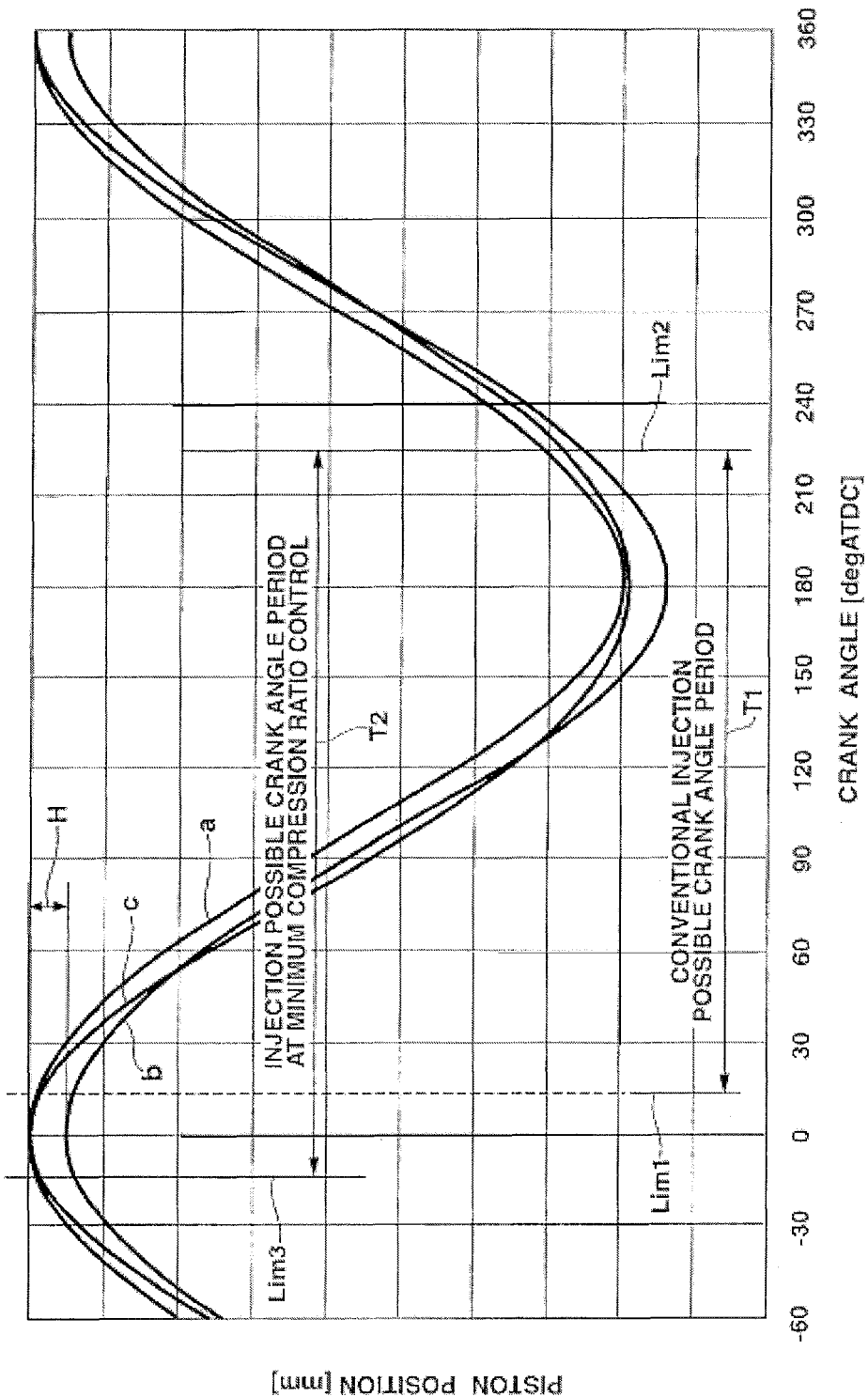
FIG. 3 is a characteristic view showing a comparison between this embodiment and a comparative example with respect to a characteristic of a piston stroke and an injection enabling period.

Next, the operations of the above-described embodiment is illustrated with reference to FIG. 3. FIG. 3 shows a position of the piston 24 with respect to the crank angle, that is, a characteristic of the piston stroke. A characteristic a is a piston stroke characteristic when the variable compression ratio mechanism 2 is in a high compression ratio state (for example, a controllable highest compression ratio). A characteristic b is a piston stroke characteristic when the variable compression ratio mechanism 2 is in a low compression ratio state (for example, a controllable lowest compression ratio). A characteristic c is a piston stroke characteristic of a fixed compression ratio engine provided with a general single link piston crank mechanism, as a reference example. In particular, the characteristic c shows a characteristic of the fixed compression ratio engine having the mechanical compression ratio and the process which are identical to those when the variable compression ratio mechanism 2 of the embodiment is in the high compression ratio control state.

A crank angle period during which the fuel can be injected at the high load (that is, when the fuel injection pulse width Ti is long) is determined by a smoke limit which is a limit with respect to the fuel injection start timing, and an evaporation and mixture limit which is a limit with respect to the fuel injection end timing. In the fixed compression ratio engine of the characteristic c which includes the general single link type piston crank mechanism, the smoke limit is the crank angle shown by Lim1 which is slightly retard angel side relative to the exhaust upper dead center. Near the exhaust upper dead center, a distance between the tip end injection hole of the fuel injection valve 8 and the crown surface of the piston 24 becomes very short. The injected fuel spraying is immediately collided with the crown surface of the piston 24, so that the injected fuel spraying is adhered in the liquid state on the crown surface and the combustion chamber wall surface around the crown surface. Accordingly, the smoke is increased. Consequently, it is not possible to inject the fuel on the advance angle side (the exhaust upper dead center side) relative to the smoke limit shown by Lim 1. Moreover, the evaporation and mixture limit shown as Lim2 in the drawing is the limit determined to ensure the time period necessary for the evaporation and the mixture of the injected fuel spraying, and, in general, is slightly retard angle side relative to the intake lower dead center. In a case where the fuel injection continues after the evaporation and mixture limit shown by Lim2, it is not possible to perform the sufficient evaporation and the sufficient mixture. This is not preferable. Accordingly, as shown as "conventional injection possible crank period" in the drawing, in the general single link type piston crank mechanism, in the period T1 from Lim1 on the retard angle side relative to the exhaust upper dead center, to Lim2 after the intake lower dead center, it is necessary that the fuel injection is started, and finished. The length of the injection period is dependent on the injection rate of the fuel injection valve 8 (the injection amount per unit time period). When the necessary fuel is injected at the high load during a relatively short period T1, the fuel injection valve 8 having the large injection rate is needed. On the other hand, in the fuel injection valve 8 having the large injection rate in this way, the injection pulse width becomes short when the fuel injection of the small amount is performed like the idling and the divided injection. The measurement accuracy is lowered.

Relative to the above-described fixed compression ratio engine, in the internal combustion engine 1 provided with the variable compression ratio mechanism 2 according to this embodiment, in the high compression ratio control state (the characteristic a), the position of the piston 24 near the exhaust upper dead center is not largely different from the characteristic c of the fixed compression ratio engine. However, in the low compression ratio control state (the characteristic b), the position of the piston 24 near the exhaust upper dead center becomes low, so that the distance between the fuel injection valve 8 and the crown surface of the piston 24 is increased (the increasing amount (distance) is shown by a symbol H in the drawing). Accordingly, even when the fuel injection is performed near the exhaust upper dead center, the generation of the smoke due to the collision of the spraying to the crown surface of the piston 24 is relatively relieved (decreased). The smoke limit becomes the advance angle side relative to the exhaust upper dead center, as shown by Lim 3 in the drawing. Lim2 is hardly influenced even in the low compression ratio control state. Accordingly, the crank period during which the injection can be performed is a period T2 from Lim3 to Lim2, so that it is longer than the term T1 in case of the fixed compression ratio engine.

In the above-described embodiment, in the predetermined high load region including the fully open condition, the target compression ratio tϵ of the variable compression ratio mechanism 2 is set to the minimum compression ratio (the controllable lowest compression ratio) or the value near the minimum compression ratio. Simultaneously, the fuel injection start timing IT is set to the advance angle side relative to the exhaust upper dead center in consideration of the smoke limit Lim3. That is, the fuel injection period is set to cross (continue across) the exhaust upper dead center. Accordingly, it is possible to inject the necessary fuel at the fully open during the time period T2 shown in FIG. 3 even by the fuel injection valve 8 having the relatively small injection rate. The deterioration of the smoke and the deterioration of the evaporation and the mixture are not caused. Moreover, the measurement accuracy at the fuel injection of the small amount is improved by using the fuel injection valve 8 having the small injection rate.

On the other hand, in the variable compression ratio mechanism 2 using the multi-link piston crank mechanism according to the above-described embodiment, in particular, the link geometry of the variable compression ratio mechanism 2 is set so that the increasing speed of the piston 24 near the upper dead center becomes smaller than that of the characteristic c, in particular, by the single link piston crank mechanism. That is, the gradients of the characteristics a and b near the upper dead center is gentler than the gradient of the characteristic c. Moreover, the increasing speed of the piston 24 near the upper dead center in the low compression ratio control state is smaller than the increasing speed of the piston 24 in the high compression ratio control state. That is, the gradient of the characteristic b near the upper dead center is slightly gentler than the gradient of the characteristic a.

In this way, the increasing speed of the piston 24 near the upper dead center is small. Accordingly, the relative speed when the fuel injected near the upper dead center is impinged on the crown surface of the piston 24 becomes small. Accordingly, the adhesion of the liquid fuel on the piston 24 and the adhesion of the liquid fuel on the wall surface of the combustion chamber around the piston 24 are suppressed. It is superior in the decrease of the smoke.

On the other hand, in a case where the fuel injection is started before the exhaust upper dead center as described above, as illustrated at the above-described step 8, the exhaust valve closing timing EVC becomes the advance angle side relative to the exhaust upper dead center to correspond to the fuel injection start timing IT for preventing the fuel from blowing through toward the exhaust port 11. It is not preferable in the point of the increase of the residual gas, to close the exhaust valve 5 at a relatively early timing in this way. However, it is possible to partially relieve the disadvantage according to the closing of the exhaust valve 5 at the early timing, by using the multi-link piston crank mechanism having the increasing speed of the piston 24 near the upper dead center as shown by the characteristic b of FIG. 3. That is, when the increasing speed of the piston 24 near the upper dead center is large like the characteristic c, the exhaust valve 5 is closed in the middle that the gas flows out through the exhaust valve 5 at the high speed. On the other hand, in the characteristic b, the increasing speed of the piston 24 in the first half of the rising process (the exhaust process) of the piston 24 is larger than that of the characteristic c. The exhaust valve 5 is closed when the flowing-out of the gas becomes weak after the much gas flows out in the first half of the exhaust process. Accordingly, the disadvantage according to the early closing of the exhaust valve 5 becomes relatively small.

Hereinabove, although the one embodiment according to the present invention is illustrated, the present invention is not limited to the above-described embodiment. Various variation can be applicable. For example, the above-described embodiment uses the variable compression ratio mechanism 2 arranged to displace the upper dead position of the piston 24 in the upward and downward directions, and thereby to vary the compression ratio. The present invention is similarly applicable to the variable compression ratio mechanism arranged to move the cylinder side in the upward and downward directions.

Moreover, in the flowchart shown in FIG. 2, the fuel injection start timing IT is preferentially determined in accordance with the engine driving condition. Accordingly, the fuel injection end timing is determined from the fuel injection start timing IT and the fuel injection period (the fuel injection amount). In place of this operation, the fuel injection end timing may be preferentially determined, and the fuel injection start timing IT may be calculated by subtracting the necessary fuel injection period converted to the crank angle from the fuel injection end timing. In this case, the fuel injection start timing IT becomes the advance angle side relative to the exhaust upper dead center in the predetermined high load region including the full open condition.

Moreover, as illustrated about step 6, the target compression ratio of the variable compression ratio mechanism 2 is basically to the lower compression ratio as the load becomes higher for avoiding the knocking. However, in the present invention, the target compression ratio of the predetermined high load region including the fully open can be set in accordance with the knocking limit. Moreover, the target compression ratio of the high load region may be set to a value lower than the knocking limit for having a priority to the smoke suppression due to the fuel injection near the exhaust upper dead center.

The invention claimed is:
1. A device comprising:
an internal combustion engine controller for an internal combustion engine, the internal combustion engine comprising a variable compression ratio mechanism arranged to vary a relative position relationship between a piston and a cylinder, and thereby to vary a mechanical compression ratio, and a fuel injection valve arranged to directly inject a fuel within a combustion chamber in accordance with a fuel injection pulse width, and
the internal combustion engine controller configured to control the mechanical compression ratio at an exhaust upper dead center to a low compression ratio in an engine high load region including a condition in which the fuel injection pulse width becomes maximum, to set a fuel injection start timing of the fuel in which an air-fuel mixture is formed within the combustion chamber, and which is ignited by an ignition plug, before the exhaust upper dead center, and to set a fuel injection end timing after an intake lower dead center so that the fuel injection valve is open continuously across the exhaust upper dead center and the intake lower dead center in the engine high load region from the fuel injection start timing to the fuel injection end timing.

2. The device as claimed in claim 1, wherein the variable compression ratio mechanism is a multi-link piston crank mechanism; and the multi-link piston crank mechanism has a link geometry set so that a piston rising speed near the upper dead center when the low compression ratio is set is smaller than a rising speed when a high compression ratio is set.

3. The device as claimed in claim 1, wherein an exhaust valve closing timing is advanced before the exhaust upper dead center to correspond to the fuel injection start timing which is advanced before the exhaust upper dead center in the engine high load region.

4. A control method for an internal combustion engine including a variable compression ratio mechanism arranged to vary a relative position relationship between a piston and a cylinder, and thereby to vary a mechanical compression ratio, and a fuel injection valve arranged to directly inject a fuel within a combustion chamber in accordance with a fuel injection pulse width, the control method comprising:
controlling the mechanical compression ratio at an exhaust upper dead center to a low compression ratio at least in an engine high load region including a condition in which the fuel injection pulse width becomes maximum,
setting a fuel injection start timing of the fuel in which an air-fuel mixture is formed within the combustion chamber, and which is ignited by an ignition plug, before the exhaust upper dead center, and
setting a fuel injection end timing after an intake lower dead center so that the fuel injection valve is open continuously across the exhaust upper dead center and the intake lower dead center in the engine high load region from the fuel injection start timing to the fuel injection end timing.

* * * * *